US011247327B2

(12) United States Patent
Doll et al.

(10) Patent No.: US 11,247,327 B2
(45) Date of Patent: Feb. 15, 2022

(54) SUPPORT RAIL FOR A ROBOT PLATFORM THAT CAN BE MOVED IN TRANSLATION, AND MOTION SYSTEM AND ROBOT SYSTEM HAVING A SUPPORT RAIL OF THIS KIND

(71) Applicants: Fredy Doll, Achern (DE); Thomas Kollmar, Flein (DE); Joachim Strack, Achern (DE)

(72) Inventors: Fredy Doll, Achern (DE); Thomas Kollmar, Flein (DE); Joachim Strack, Achern (DE)

(73) Assignee: IPR—INTELLIGENTE PERIPHERIEN FUER ROBOTER GMBH, Eppingen (DE)

( * ) Notice: Subject to any disclaimer, the term of this patent is extended or adjusted under 35 U.S.C. 154(b) by 941 days.

(21) Appl. No.: 15/595,252

(22) Filed: May 15, 2017

(65) Prior Publication Data
US 2018/0272522 A1  Sep. 27, 2018

(30) Foreign Application Priority Data
Mar. 23, 2017 (EP) .................................. 17162660

(51) Int. Cl.
*B25J 5/02* (2006.01)
*B25J 19/00* (2006.01)

(52) U.S. Cl.
CPC . *B25J 5/02* (2013.01); *B25J 19/00* (2013.01)

(58) Field of Classification Search
CPC ......... B25J 5/00; B25J 5/02; B25J 5/04; B25J 9/162; B25J 19/00; Y10T 29/49632;
(Continued)

(56) References Cited

U.S. PATENT DOCUMENTS 2,340,176 A * 1/1944 Clement ................. E04C 3/294
52/334
3,300,140 A * 1/1967 Moses ....................... E01B 3/38
238/25
(Continued)

FOREIGN PATENT DOCUMENTS

AU    200189350 A1    5/2002
BE       495085         8/1950
(Continued)

OTHER PUBLICATIONS

European Patent Office Search Report issued in Application No. 17 16 2660 with English translation of category of documents cited dated Oct. 11, 2017 (8 pages).
(Continued)

*Primary Examiner* — Jonathan Liu
*Assistant Examiner* — Guang H Guan
(74) *Attorney, Agent, or Firm* — Flynn Thiel, P.C.

(57) ABSTRACT

A support rail for a robot platform. The support rail is an elongate component having a metal guide rail, provided on an outer side, for guiding the robot platform. The platform has, in a downward-facing subsection, a lower metal connection flange for fastening the support rail on an underlying surface, such as a factory floor, and, in an upward-facing subsection, on an outer side, an upper metal connection flange for mounting the metal guide rail. The support rail has a concrete support structure, on the outer side of which the lower metal connection flange and the upper connection flange or the guide rail are mounted. The upper metal connection flange, the lower metal connection flange and/or the guide rail are secured on the support structure by ties engaging positively in the support structure, and/or via a connecting inner frame surrounded by the support structure.

26 Claims, 6 Drawing Sheets (58) Field of Classification Search
CPC . E01B 1/00; E01B 1/002; E01B 1/004; E01B 29/00; E01B 29/005
See application file for complete search history.

(56) References Cited

U.S. PATENT DOCUMENTS

| | | | |
|---|---|---|---|
| 3,540,068 A | 11/1970 | Bouthors | |
| 3,630,153 A | 12/1971 | Guimarin | |
| 3,665,148 A * | 5/1972 | Yasenchak | B25J 5/02 219/124.4 |
| 4,042,308 A | 8/1977 | Freedman | |
| 4,660,344 A * | 4/1987 | Gaudelli | B28B 7/08 404/7 |
| 4,700,923 A * | 10/1987 | Lewis, Jr. | F16M 3/00 248/500 |
| 5,456,183 A | 10/1995 | Geldbaugh | |
| 5,934,198 A | 8/1999 | Fraser | |
| 7,066,094 B2 | 6/2006 | Moutsokapas et al. | |
| 7,641,127 B2 | 1/2010 | Markus | |
| 9,272,382 B2 * | 3/2016 | Trnka | B24B 1/00 |
| 10,414,040 B2 * | 9/2019 | Wells | B25J 5/02 |
| 10,737,380 B2 * | 8/2020 | Reuter | B25J 5/02 |
| 2004/0182946 A1 * | 9/2004 | Reichel | E01B 1/004 238/5 |
| 2011/0274232 A1 * | 11/2011 | Doll | B25J 5/02 376/260 |
| 2017/0096306 A1 * | 4/2017 | Son | B65G 47/907 |
| 2018/0016751 A1 * | 1/2018 | Botello Rojas | E01B 1/00 |
| 2018/0272522 A1 * | 9/2018 | Doll | E01B 23/02 |
| 2019/0047138 A1 * | 2/2019 | Doll | E01B 5/08 |
| 2019/0047139 A1 * | 2/2019 | Doll | B25J 5/02 |

FOREIGN PATENT DOCUMENTS

| | | | | |
|---|---|---|---|---|
| CN | 102699894 A | | 10/2012 | |
| CN | 102922520 A | | 2/2013 | |
| CN | 105179474 A | | 12/2015 | |
| DE | 202 15 204 U1 | | 1/2003 | |
| EP | 0536600 A1 | | 4/1993 | |
| EP | 0440597 B1 * | | 2/1994 | E01B 1/001 |
| EP | 1914043 A1 * | | 4/2008 | B25J 5/02 |
| FR | 1 425 444 | | 1/1966 | |
| FR | 2 833 632 A1 | | 6/2003 | |
| KR | 10-1059578 B1 | | 8/2011 | |
| WO | WO 2005/009691 A1 | | 2/2005 | |

OTHER PUBLICATIONS

Chinese Office Action, with English translation, issued in corresponding Chinese Patent Application No. 201710338427.6 dated Dec. 17, 2020 (19 pages).

* cited by examiner

SUPPORT RAIL FOR A ROBOT PLATFORM THAT CAN BE MOVED IN TRANSLATION, AND MOTION SYSTEM AND ROBOT SYSTEM HAVING A SUPPORT RAIL OF THIS KIND

CROSS-REFERENCE TO RELATED APPLICATIONS

This claims priority from European Patent Application No. 17162660.9, filed on Mar. 23, 2017, the disclosure of which is hereby incorporated by reference in its entirety.

AREA OF APPLICATION AND PRIOR ART

The invention relates to a support rail for a robot platform that can be moved in translation in accordance with the precharacterizing clause of claim 1. The invention furthermore relates to a motion system having a support rail of this kind, together with a robot platform, and to a robot system having a support rail of this kind. Moreover, the invention relates to methods for producing a support rail according to the invention.

Support rails of the type in question are widely known in the prior art. These support rails, which are sometimes also referred to as a seventh axis or travel axis, are used to move a conventional industrial robot horizontally in translation by means of the robot platform mounted thereon in a manner which allows movement in translation. There is a need for this in many industrial areas of application, e.g. in manufacture, when the robot is to be used at different locations, or in cases where, in the course of its intended use, the robot itself is supposed to be able to approach a workpiece store and there grab a workpiece to be installed.

Support rails of the type in question are generally fastened by means of a floor-side connection flange on an underlying surface, in particular on a factory floor. On the upper side thereof, they generally have two guide rails, on which wheels of the movable robot platform roll.

Known support rails are designed as fully metal support rails, generally made of aluminium or steel. This leads to a relatively high price for the support rails.

Problem and Solution

The problem underlying the invention is to make available a support rail, together with a production method suitable for the latter, by means of which support rails can be produced more advantageously than previously while having good properties in operation.

A support rail according to the invention is in the form of an elongate component aligned in a main direction of extent and having at least one metal guide rail, provided on the outer side and extended in the main direction of extent, for guiding the robot platform.

The support rail has, in a downward-facing subsection, at least one lower metal connection flange for fastening the support rail on an underlying surface, such as a factory floor. In an upward-facing subsection, on an outer side oriented upwards or to the side, the support rail has at least one upper metal connection flange for mounting the metal guide rail and/or has the at least one metal guide rail directly.

According to the invention, the support rail has a support structure made of concrete, on the outer side of which the at least one lower metal connection flange and the at least one upper connection flange or the guide rail are mounted. Here, the upper metal connection flange, the lower metal connection flange and/or the guide rail are fastened on the support structure made of concrete, in particular by means of ties engaging positively in the support structure made of concrete and/or by means of a connecting inner frame surrounded by the support structure.

In the case of a support rail according to the invention, it is thus envisaged that said rail has a concrete support structure forming the majority of the support rail, wherein it is possible in principle to use traditional cement concrete or polymer concrete. Owing to the large loads and moments acting on a support rail of the type in question, the use of an ultrahigh strength concrete (UHPC/UHFB) is particularly advantageous. Concrete grades of this kind are distinguished by the fact that they also withstand tensile stresses relatively well, this being of significance in the context of the present invention. Depending on the stresses to be expected and the means of reinforcement in the concrete, an ultrahigh strength concrete of this kind is absolutely necessary, however.

The support structure made of concrete extends as a unitary support structure over the entire length of the support rail and, depending on the embodiment, is completed at the end by a connection flange, which will be explained below.

In the case of a support rail according to the invention too, the component parts of the support rail used to fasten the latter to a factory floor or to guide the robot platform are produced from metal, in particular from steel or aluminium. These include, first of all, the lower connection flange, which, in particular, can be in the form of a baseplate, i.e. a structure which has a flat underside for resting on a factory floor. Moreover, the guide rail and optionally an upper connection flange for mounting the guide rail are also of metal design.

For the attachment of these metal components to the support structure made of concrete, the two already mentioned methods are provided according to the invention. In an embodiment with an inner frame, it is envisaged that the lower connection flange, that is to say, in particular, the baseplate, is connected to the upper connection flange for mounting the guide rail or to the guide rail itself via an inner frame. In the simplest case, this inner frame is made up of metal rods, which are secured at the ends adjacent to the lower connection flange and to the upper connection flange or the guide rail, in particular by means of welded joints. The inner frame is completely surrounded by the support structure. It is used, in particular, to absorb tensile forces in the event of large moments acting on the robot platform since concrete as a material has only limited suitability for this purpose. As a result, the connection flange provided at the top and bottom of the inner frame in each case acts as it were as a positive safeguard against tensile forces introduced on the opposite side. Tensile stresses on the support structure made of concrete are thereby partially or completely avoided.

However, the provision of this inner frame is not without alternatives. If a concrete grade which is sufficiently stable under tensile forces is selected, it is possible to dispense with the direct metallic joint between the lower connection flange, on the one hand, and the upper connection flange and that of the guide rail, on the other hand, by means of the inner frame in favour of ties, around which the concrete is poured, offering positive retention. The ties are metal structures which are screwed on, welded on or connected in some other way, project into the support structure made of concrete and widen there relative to an anticipated direction of separation.

The upper connection flanges or the guide rails are usually designed as profiles extended in the main direction of extent.

It has therefore proven particularly advantageous to form the profiles there at least partially by extruded profiles extended in the main direction of extent, in particular by I-section profiles or T-section profiles, wherein, in particular, a plurality of such ties formed by extruded profiles is preferably mounted on a connection flange or on a guide rail at intervals in the main direction of extent and/or ventilation holes are provided in the extruded profile. It is also advantageous to arrange for a plurality of such ties on the same connection flange or the same guide rail to project with different alignments into the support structure to enable tensile forces acting in different directions to be absorbed in optimum fashion.

The use according to the invention of concrete has proven a positive factor in several respects. On the one hand, the production costs for a support rail according to the invention are considerably reduced as compared with a fully metal configuration.

On the other hand, the damping properties of a support rail of this kind have also proven advantageous. The concrete provides damping, by means of which shocks in the environment of the robot have only a relatively slight negative effect on the positioning accuracy of the robot.

Moreover, the configuration according to the invention offers logistical advantages. Thus, it is possible, for example, when exporting such support rails overseas, to dispense with transporting the support structure itself since this can often also be produced on site.

At least one of the connection flanges or the guide rail preferably rests directly against and flush with the support structure made of concrete by virtue of the fact that the concrete is poured onto the relevant component or partially encases the relevant component.

Admittedly, the support rail according to the invention, which comprises the support structure made of concrete and other components made of metal can, in principle, be produced in a manner to be explained below such that the support structure is cast in isolation and only then provided with the metal components, with the result that there is no directly flush contact in the sense intended here. It is preferred, however, if the connection flanges or the guide rails are introduced into the formwork during the pouring in of the concrete, thereby giving rise to the directly flush construction and thereby achieving a relatively firm connection to the concrete even without taking into account the ties or the inner frame. This also eliminates subsequent assembly steps, and relatively accurate positioning of the enclosed or partially encased components becomes possible.

The at least one lower metal connection flange is preferably formed by at least one baseplate, i.e. a metal body with a large-area supporting surface, which has holes for mounting on the underlying surface, wherein a plurality of mutually spaced baseplates is preferably provided.

However, the connection flange can also have at least one threaded hole for mounting a baseplate, wherein a plurality of threaded holes for mounting one or more baseplates is preferably provided on one or more lower connection flanges.

Two guide rails, which are spaced apart sufficiently to enable tilting moments on the robot platform to be reliably absorbed, are generally provided for guiding the robot platform.

One possible embodiment of the support rail according to the invention envisages that the two rails are part of a common metal rail plate which covers the entire upper side of the support structure made of concrete. At least two separate upper metal connection flanges are preferably provided on the outer side of the support structure, each being provided for mounting one of the guide rails and each having dedicated ties or each being connected separately to the inner frame surrounded by the support structure.

As an alternative, it is also possible for at least two separate guide rails to be provided in each case directly on the outer side of the support structure and each to be fitted with a dedicated tie or each to be connected separately to the inner frame surrounded by the support structure.

Using two separate guide rails ensures that costs are reduced relative to a comparatively large structure having two integrated guide rails. Moreover, it allows the use of two separate guide rails of identical construction with support rails that have a differently shaped surface of the support structure on an upper side of the support rail or different track widths. Depending on the type of motion system, provision is made for a recess to be provided on the upper side of the support rail, in which a cable harness is routed. The use of two separate metal guide rails or two separate upper connection flanges for mounting one guide rail in each case makes it possible to use these components unaltered, irrespective of the question whether the support rail is to be designed with a recess of this kind or without a recess of this kind. In the case of a non-integral embodiment, the region between the two guide rails or upper connection flanges is formed by parts of the support structure made of concrete.

In addition to the connection flanges mentioned, a further metal connection flange for the purpose of coupling a further support rail and/or for mounting an end stop for the robot platform is preferably provided on at least one end of the support rail. This further metal connection flange is preferably connected via the inner frame to the lower metal connection flange and/or to the upper metal connection flange or the guide rail.

In particular, the additional connection flange mentioned can serve one of two purposes. On the one hand, it is possible for a connection flange of this kind to be connected to a corresponding connection flange of a second support rail in order to allow a longer path of movement for the robot platform. Support rails according to the invention generally have a length of at least 3 m, in particular a length between 4 and 10 m. Longer paths of movement are generally achieved by the use of a plurality of coupled support rails, wherein the said metal connection flange at the end of the support rail makes it possible to couple two support rails to one another in a very simple and precise manner. In the case of such coupling of a plurality of support rails, guide rails are preferably mounted in an overlapping fashion on the upper connection flanges.

Like the already mentioned connection flanges on the lower side and the upper side of the support rail, the connection flange at the end is also preferably connected metallically to the other components mentioned either by a tie engaging in the support structure or by a means of attachment to the inner frame. A particularly advantageous embodiment provides for the connection flange at the end to be mounted, in particular welded, directly on the upper connection flange or the two upper connection flanges. In addition, it can also be advantageous to attach it directly or via connecting segments metallically to the lower connection flange.

In addition to mounting a further guide rail, the same metal connection flange at the end can also be used to mount an end stop at this point, said end stop limiting the path of movement of the robot platform in the manner of a buffer. Particularly when this is provided, it is expedient to mount the connection flange at the end directly on the upper connection flanges or the guide rails.

If no flexibility is required in individual cases, it is also possible, instead of the metal connection flange, to which the end stop is fastened, e.g. screwed, to mount an end stop directly in the same way on the support structure, i.e. by attachment, welding or screwing, to the inner frame or by means of ties.

In principle, the lower metal connection flange, which is preferably designed as a baseplate, can be in the form of a single continuous baseplate. However, a plurality of lower metal connection flanges is preferably provided on the lower side of the support rail, these being designed, in particular, in the manner of baseplates. This plurality of connection flanges can be mounted on a common inner frame or mounted on the common guide rail or on a common upper metal connection flange by means of mutually separate subsections of the inner frame.

The use of a plurality of mutually spaced baseplates is advantageous particularly owing to the preferred method of production since the regions between the baseplates allow the liquid concrete to be fed in. Moreover, a continuous baseplate is generally not required, and therefore overall costs can be lowered by means of the plurality of lower metal connection flanges, in particular baseplates. In an embodiment in which an inner frame is used, by means of which the lower connection flanges/baseplates are connected metallically to the guide rails or the upper connection flanges for the guide rails, two embodiments are conceivable. On the one hand, a unitary inner frame can be provided, on which all the lower connection flanges/baseplates are mounted. However, there is a preference for an embodiment in which the lower connection flanges are each connected via the said mutually separate subsections, in the simplest case approximately vertically extended metal struts, to the one or the plurality of upper connection flanges or the guide rails there.

The metal inner frame is preferably connected to at least one of the connection flanges or to the guide rail by a welded joint. As an alternative or also in addition to the welded joints, the metal inner frame can be connected to at least one of the connection flanges or to the guide rail by a threaded joint. The same also applies to the ties.

Connecting the inner frame to one of the connection flanges or to the guide rails by means of a threaded joint is regarded as advantageous particularly where the method of production which is, in principle, not the preferred one, in which the support structure made of concrete is first of all produced without metal connection flanges and is only then subsequently provided with these, is chosen.

Since the support rail according to the invention is relatively heavy owing to the concrete, it can be advantageous if, in order to reduce the mass through appropriately designed formwork, free regions which are not filled with concrete remain during the forming process. Instead of achieving this through the shaping of the formwork, it can be simpler to embed plastic blocks, in particular polystyrene/expanded rene/expanded polystyrene blocks, in the support structure. This is also expedient especially because the highest stress on the support structure is to be expected, in particular, underneath the guide rails. However, a region between two guide rails is subject to less stress, and therefore the said blocks can expediently be accommodated there.

Alternatively the blocks could be made of glass wool, mineral wool or aluminum wool. Such a block could then be interfused by the concrete, leading to the combination of weight saving and strengthening of the support structure.

In order to be able to transport the comparatively heavy support rails of the type according to the invention, it can be advantageous if through channels are provided in the support structure transversely to the main direction of extent, through which transport cables or transport rods can be passed for the purpose of transportation. To ensure that the concrete is not damaged during this process, it is particularly advantageous if hollow profiles or tubes made of plastic or metal are used to line these through channels. These hollow profiles are preferably introduced at the same time as the support structure made of concrete is poured into the formwork and they thus keep the through channels open. It is furthermore regarded as advantageous if reinforcing rods or other reinforcing means are placed in the support structure made of concrete in the manner conventional in concrete construction. As a particular preference, reinforcing rods can extend in the main direction of extent of the support rail. Where high-strength cement concrete or polymer concrete is used, it may also be possible to dispense with such reinforcement.

In principle, it is regarded as unproblematic if the outer surface of the support structure made of concrete also forms the outer surface of the support rail directly and without further finish-machining. However, to avoid abrasion here, several conceivable measures can be taken. Thus, for example, it is possible to grind the surface of the support structure at least in some section or sections in order to avoid the subsequent abrasion here. It is also possible to apply to the concrete a coating which reduces the abrasion. In extreme cases, it is even conceivable to encase the support structure made of concrete completely with a protective layer consisting, for example, of plastic. It is thereby also possible to exert a potentially positive effect on the aesthetic effect of the support rail.

The invention furthermore relates to a motion system for a robot, which has at least one support rail with at least one guide rail of the type described above provided thereon and at least one robot platform, on which a robot is arranged in accordance with the intended purpose.

As already explained at the outset, the robot platform preferably has wheels, which are guided on the guide rails of the support rail. Movement of the robot platform is generally accomplished by means of a motor on the robot platform, which interacts with a rack. This rack is preferably mounted together with the guide rail on an upper connection flange of the support rail. A cable harness is furthermore generally provided, which cable harness is routed from the outside to the robot platform that can be moved in translation and which can contain electrical, pneumatic and hydraulic lines and optionally also enables the supply of consumables. In a motion system according to the invention, this harness is preferably provided, in particular, centrally between two guide rails and is therefore guided there in a recess formed by the support structure. In other embodiments, however, the cable harness is routed laterally next to the guide rail. Likewise included by the invention is a robot system having a motion system of this kind and a robot mounted on the robot platform.

The invention furthermore also relates to methods for producing the support rail described.

In a first variant, it is envisaged that a metal structure is first of all created, comprising an inner frame and at least one lower metal connection flange and at least one upper metal connection flange or a guide rail, wherein these at least two parts are preferably welded to the inner frame. This metal structure is placed in formwork and this is then filled with concrete, thereby forming the support structure, wherein the inner frame is at least partially surrounded by the concrete and wherein the at least one connection flange or the guide rail is arranged at least partially outside a surface of the support structure.

This variant represents the preferred variant for producing a support rail according to the invention. By means of the inner frame, which unites the lower connection flanges and the upper connection flanges or guide rails, the arrangement thereof relative to one another is already largely fixed. The introduction of the concrete creates a composite structure capable of bearing very high stresses.

In a second variant, it is envisaged that at least one lower metal connection flange and at least one upper metal connection flange or one guide rail are placed in an outer region in the formwork, wherein at least one tie per connection flange or guide rail projects into an interior space of the formwork. The formwork is then filled with concrete, thereby forming the support structure, wherein the ties are surrounded with concrete in such a way that they counteract separation from the support structure by positive engagement, and wherein at least one connection flange or the guide rail is arranged at least partially outside a surface of the support structure.

In this variant of the method, the individual connection flanges or guide rails must be positioned individually in the formwork, somewhat increasing the risk of inaccuracy of position as compared with the first variant of the method. In this method, care should be taken, in particular, to ensure that it is still possible for air to escape in the region of the ties, which form a positive joint in accordance with the purpose thereof. This is achieved, in particular, by means of the tie sections already mentioned at the outset, formed by profiles. Instead, the profiles which form the ties could also be of continuous design. In this case, air escape openings should preferably be provided in the profiles.

In a third variant, a concrete body forming the support structure is cast in formwork, in which through holes for the inner frame are kept free during the casting process itself or in which through holes are introduced after the casting process. It is only then that the inner frame is inserted into the through holes and connects connection flanges mounted at opposite ends or at least one connection flange and one guide rail.

This third variant of the method is regarded as tending to be disadvantageous since the very close connection between the metal connection flanges and the support structure made of concrete is not achieved here in the same way. The possibility of producing the support structure and the connection flanges separately and only combining them into a support rail later may be advantageous logistically, however.

Provision is preferably made for the outer surfaces of the support structure to be at least partially ground and/or provided with a coating.

The as yet unfinished support rail, comprising the support structure and the connection flanges, is preferably finish-machined in the region of at least one connection flange or of the guide rail, in particular by means of grinding and/or drilling.

Although it is possible, in principle, to machine the connection flanges in respect of the outward-facing surfaces and holes thereof even before connection to the support structure, the method described involving finish-machining is regarded as advantageous in respect of accuracy. A high accuracy is achieved by virtue of the fact that machining, that is to say, for example, the introduction of holes and the grinding of contact surfaces, takes place after the inner frame or the ties have been surrounded with the support structure made of concrete. However, it is necessary for this purpose that the as yet unfinished support rail is inserted into a suitable machining centre for machining, despite its dimensions and its mass.

It is particularly preferred if, during the casting of the support structure, the upper connection flanges or the guide rails face downwards and the lower connection flanges face upwards. Since the precision of the upward-facing surfaces, in particular, is relevant in the case of a support rail according to the invention, while the surfaces facing the factory floor are of secondary importance, it has proven advantageous to provide the said upside down position during the casting of the support structure.

BRIEF DESCRIPTION OF THE DRAWINGS

Further advantages and aspects of the invention will emerge from the claims and from the following description of preferred illustrative embodiments of the invention, which are explained below with reference to the figures.

DETAILED DESCRIPTION OF THE ILLUSTRATIVE EMBODIMENTS

Figure 1:
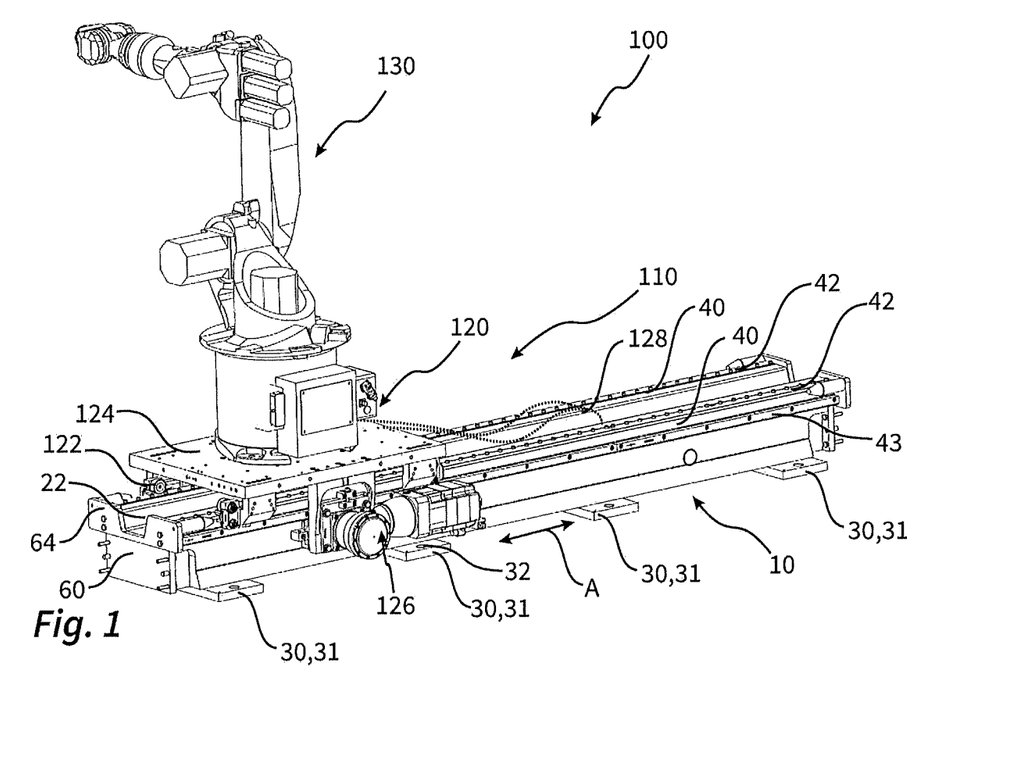
FIG. 1 shows a robot system according to the invention having a motion system with a robot platform, on which a robot is mounted.

FIG. 1 shows a robot system 100 according to the invention, which can be used, in particular, in the context of production.

The robot system 100 has a motion system 110 comprising a horizontally aligned support rail 10 and a platform 120, which can be moved on this support rail 10 in the direction of extent A of the support rail 10. The support rail 10 has, on the underside thereof, connection flanges 30 in the form of baseplates 31, which are provided with holes 32 to enable it to be fastened securely on an underlying surface, in particular a factory floor or a pedestal provided for this purpose. Provided on the upper side of the support rail 10 are two mutually spaced parallel connection flanges 40, on each of which a guide rail 42 is securely screwed. The platform 120 can be moved on these guide rails, for which purpose it has rollers 122. The drive is provided by a motor 126, which drives a pinion (not shown), which interacts with a rack 43 of the support rail 10. Provided on the ends of the support rail 10 are respective end stops 64 in order to limit the mobility of the platform 120. An industrial robot 130 with a robot arm capable of multi-axis pivoting is provided on the upper side 124 of the platform 120.

Mounting the industrial robot 130 on the platform 120 gives the robot a further degree of freedom, which can be used, for example, to reach processing locations that are further apart or to approach a store in order to collect components there.

To supply the platform 120 and the industrial robot 130, a cable harness 128 (illustrated in dashed lines) is provided, which is accommodated in a trough-like recess 22 between the guide rails 42.

The support rail 10 is produced primarily from metal connection flanges and attachments and from a support structure 20 made of concrete forming the basic structure of the support rail 10. In particular, use can be made of ultrahigh strength concrete here.

Figure 2:
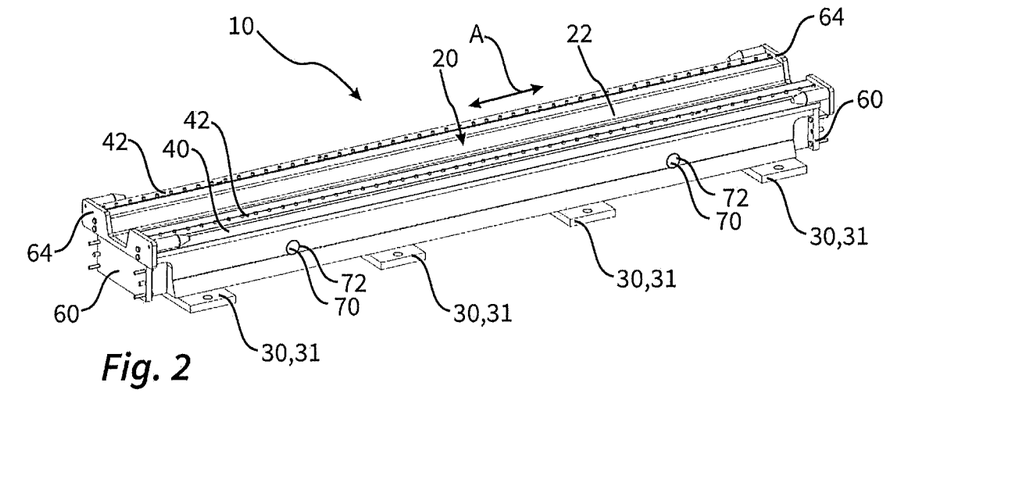
FIG. 2 shows a support rail of the robot system according to FIG. 1 in isolation.

With reference to FIG. 2, the main outer surfaces of the support rail 10 shown there are formed by the support structure 20, which is cast from concrete. In addition to the already mentioned elements of the lower connection flanges 30, designed as baseplates 31, and of the upper connection flanges 40, designed as mounting strips, and the guide rails 42 mounted thereon, two connection flanges 60 mounted on the ends and the two end stops 64 are also produced predominantly from metal. To make transportation easier, through passages 70 defined by tubular hollow profiles 72 are provided transversely to the main direction of extent A.

Figure 3:
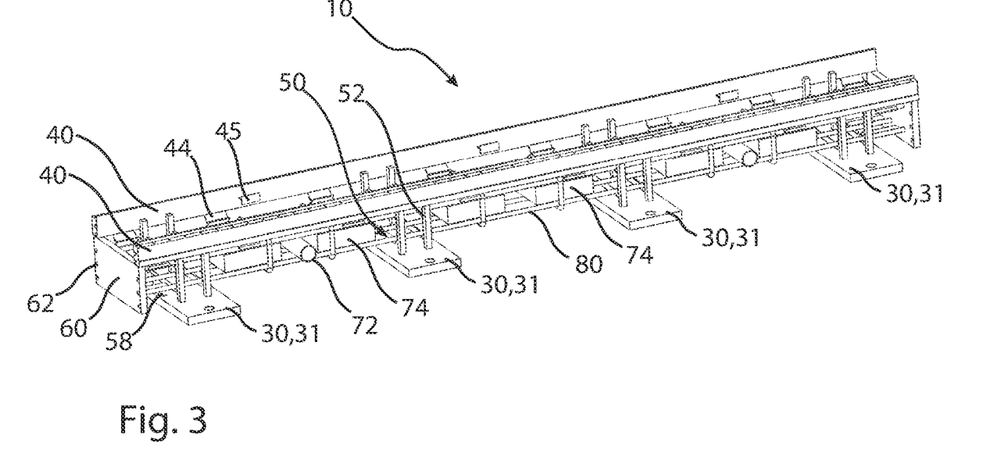
FIGS. 3 to 5 show a first variant of the construction of the support rail in FIG. 2.
Figures 4, 5:
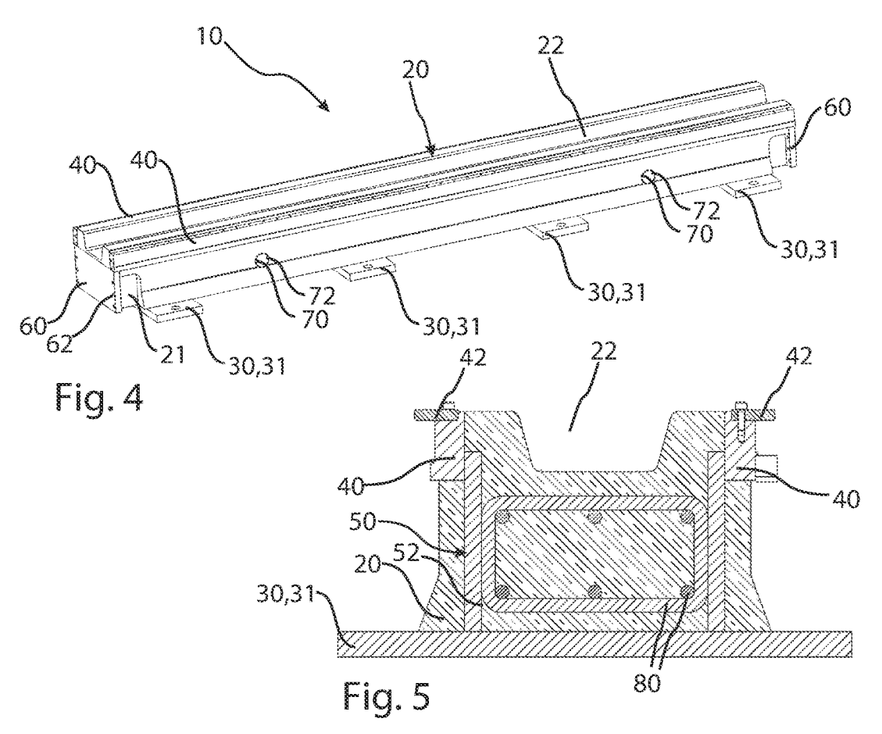

The construction of the support rails 10 is explained in greater detail by means of FIGS. 3 to 5, on the one hand, and 6 to 8, on the other hand.

The first illustrative embodiment in FIGS. 3 to 5 is distinguished by the fact that the upper connection flanges 40 for mounting the guide rails 42 and the lower connection flanges 30 in the form of baseplates 31 are connected to one another by an inner frame 50. In the present case, this inner frame 50 is formed by a total of 16 vertically aligned subsections 52 in the form of metal struts, which, on the one hand, are welded laterally to the strip-type upper connection flanges 40 and, on the other hand, are welded at the ends, at the bottom, to the lower connection flanges 30. This can be seen especially from FIG. 3, in which the support structure 20 made of concrete is omitted. It can likewise be seen from FIG. 3 that a reinforcement 80 for the purpose of increasing strength is inserted within the support structure 20 and that polystyrene blocks 74 are furthermore inserted here to reduce the mass of the support rail 10. It can furthermore be seen that the connection flanges 60 at the ends are connected directly to the ends of the upper connection flanges 40, in particular by means of a welded joint, and are furthermore welded to the baseplates 31 by means of connecting sections 58. Moreover, ties 44, 45 are provided on some of the connection flanges, in the present case on the upper strip-type connection flanges 40, the said ties performing the task of improving the connection to the support structure 20 made of concrete in the regions between the baseplates 31 and the subsections 52. In principle, however, such ties are not absolutely essential in the illustrative embodiment in FIGS. 3 to 5 since positive attachment of the metal components to the support structure 20 is already provided by the inner frame 50. It is thereby possible, in particular, to absorb moments exerted on the support rail by the robot 130 and associated tensile forces.

FIG. 4 shows the support rail 10 including the support structure 20 made of concrete. As can be seen, the flanges 60 at the ends, the upper flanges 14 and the lower connection flanges 30 and the hollow profiles 72 form the only elements which are not surrounded by the concrete of the support structure 20. In the region of the connection flanges 60 at the ends, recesses 21 are provided in the support structure 20 in order to allow access from here to the screw holes 62 in the connection flanges 60. By means of these connection flanges 60, a plurality of support rails of the same type can be connected to one another.

FIG. 5 once again shows the support rail 10 in a cross-sectional view, from which it is clearly apparent how the lower connection flanges 30 are connected integrally via the welded-on subsections 52 of the inner frame 50 to the upper connection flanges 40 designed as strips. It can furthermore be seen how the guide rails 42 are connected by screwed joints to the connection flanges 40.

Figure 6:
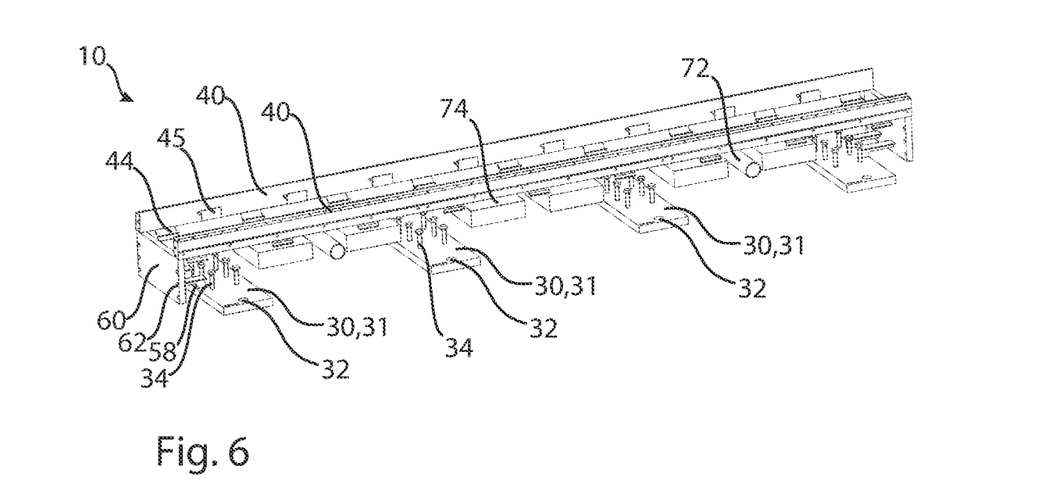
FIGS. 6 to 8 show a second variant of the construction of the support rail in FIG. 2.
Figure 7:
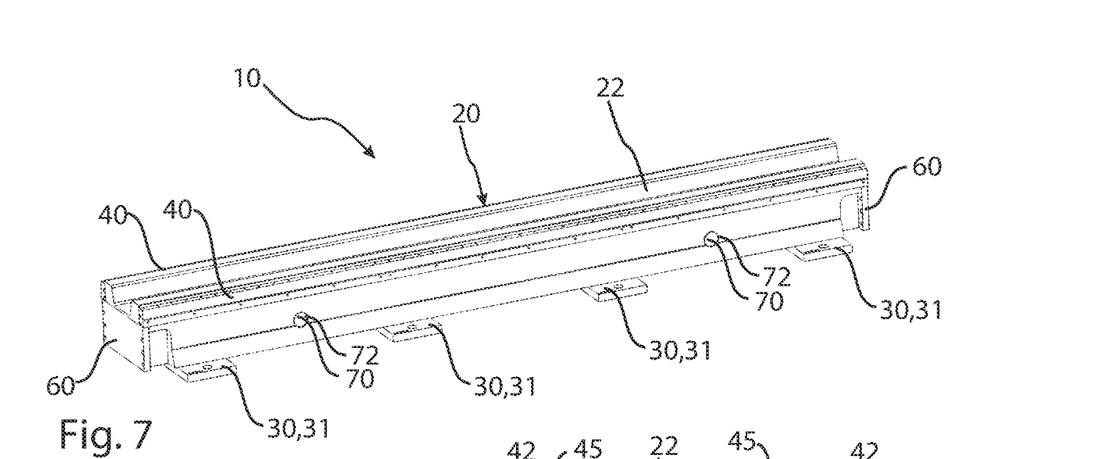
Figure 8:
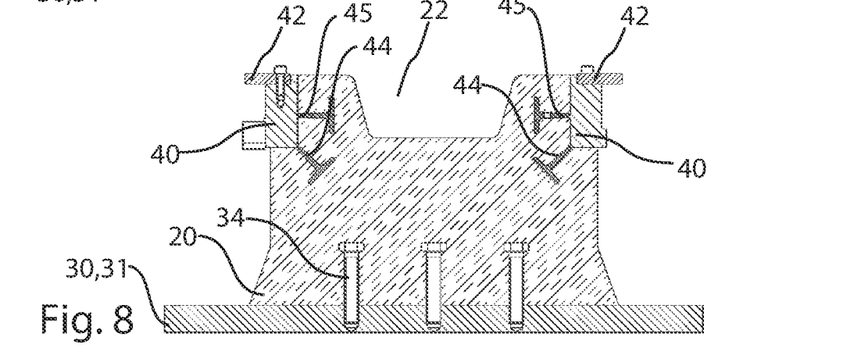

The second illustrative embodiment in FIGS. 6 to 8 corresponds, apart from the following stated differences, to the illustrative embodiment in FIGS. 3 to 5.

The most relevant difference is that there is no inner frame provided to metallically connect the lower connection flanges 30 on the bottom side to the upper connection flanges 40. Instead, ties 44, 45 formed by profile sections are provided, similarly to the preceding illustrative embodiment, although these are also provided in larger numbers and placed closer to the upper connection flanges 40. In addition, ties 34 are also provided on the connection flanges 30 on the bottom side, wherein screws are used for this purpose in the present case, as can be seen especially from FIG. 8.

The second relevant difference with respect to the illustrative embodiment in FIGS. 3 to 5 is that, in the present case, no reinforcement 80 is placed in the concrete. This has to do with the fact that the embodiment in FIGS. 6 to 8 with ties 34, 44, 45 instead of an inner frame 50 is preferred especially when ultrahigh strength concrete, which is also well suited to bearing tensile stresses, is used. When using such concrete, however, it is possible in individual cases to dispense with the reinforcement 80.

Figure 9:
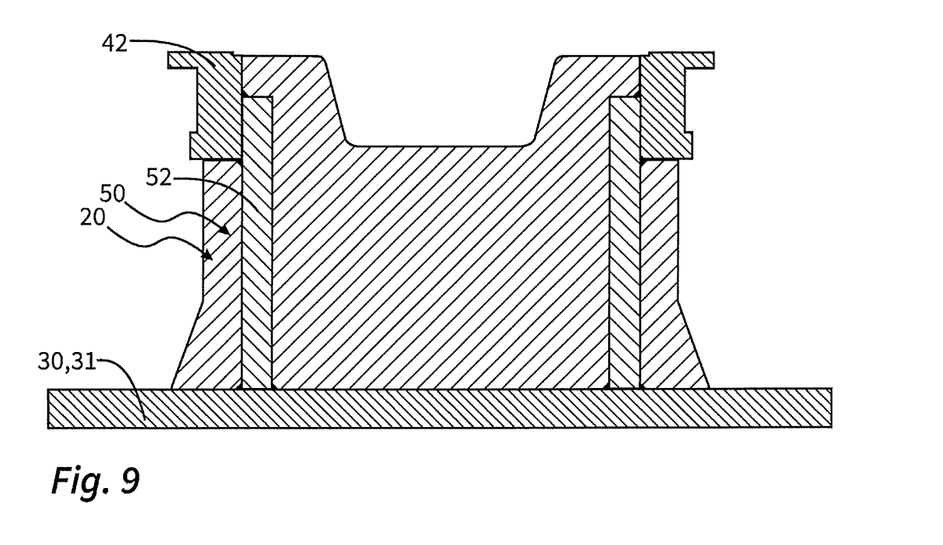
FIGS. 9 to 12 show different variations of the variants in the previous figures.
Figure 10:
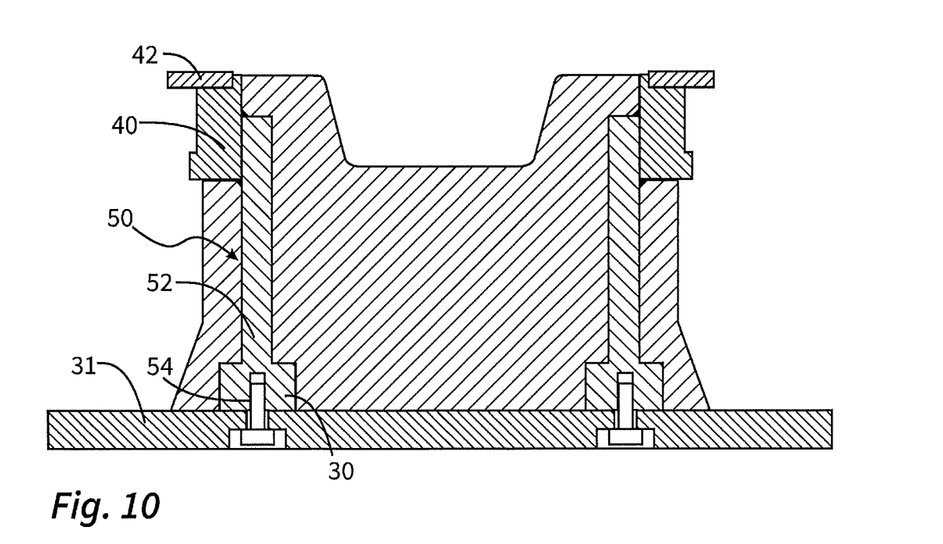
Figure 11:
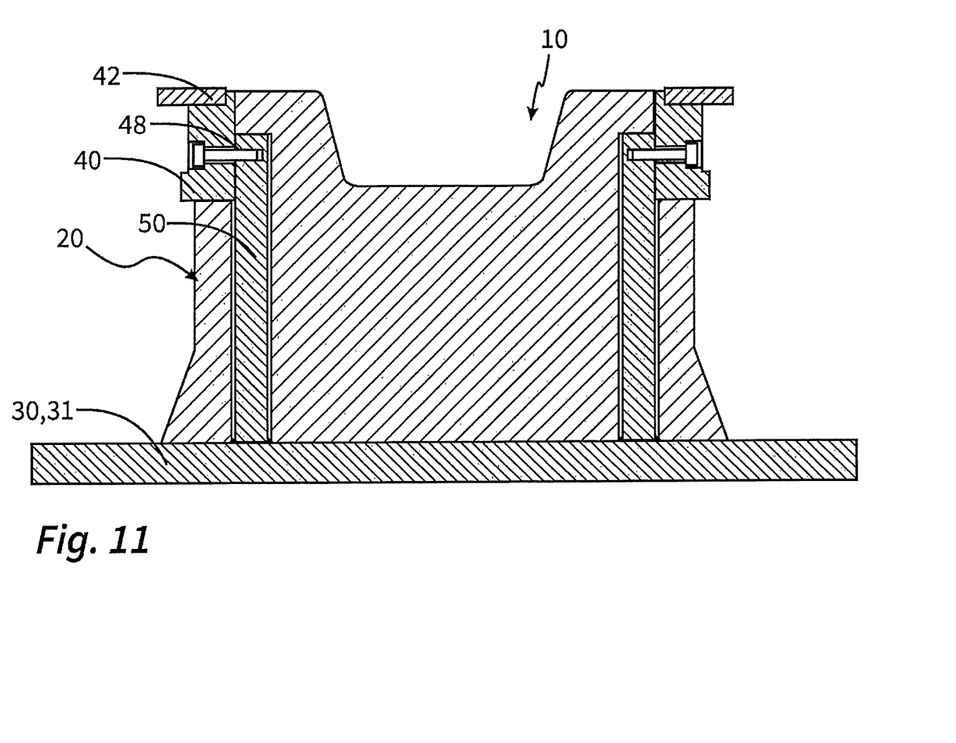

FIGS. 9 to 11 shows various variations of the two preceding illustrative embodiments in FIGS. 3 to 5 and 6 to 8.

In the illustrative embodiment in FIG. 9, there is the special feature that no separate guide rails 42 are provided for mounting on connection flanges 40; instead the guide rails 42 are integrally and directly part of the integral composite structure including the inner frame 50 and the connection flanges 30 on the bottom side. However, such a construction is not preferred, owing to the lack of exchangeability of the guide rails 42.

The special feature in the embodiment in FIG. 10 is that, as a departure from the preceding embodiments in FIGS. 3 to 5 and 9, the connection between the upper connection flanges 40 and the baseplates 31 is not provided only by welded joints. Admittedly, the inner frame 50 is once again welded to the upper connection flanges 40. However, the connection to the baseplate 31 is established by means of a screwed joint 54, by means of which the baseplate 30 is secured at the end in the rod subsections forming the inner frame 50. Since the subsections 52 are widened at the bottom end, they already themselves form as it were the lower connection flanges 30.

The embodiment in FIG. 11 differs from all the preceding embodiments in that the support rail 10 shown in FIG. 11 is produced in a fundamentally different way from the previous embodiments. Here, the support structure 20 made of concrete is produced separately. It is only afterwards that the connection flange 30 on the bottom side has been inserted into the support structure 20 from below together with the inner frame 50 welded thereto and that the upper connection flanges 40 have been screwed to the inner frame 50 by means of a screwed joint 48. Such an embodiment and such a production method are not considered advantageous but can be expedient in individual cases, especially if it is of logistical value to be able to produce the support structure 20, on the one hand, and the connection flanges 30, 40 and the inner frame 50, on the other hand, at separate locations.

Figure 12:
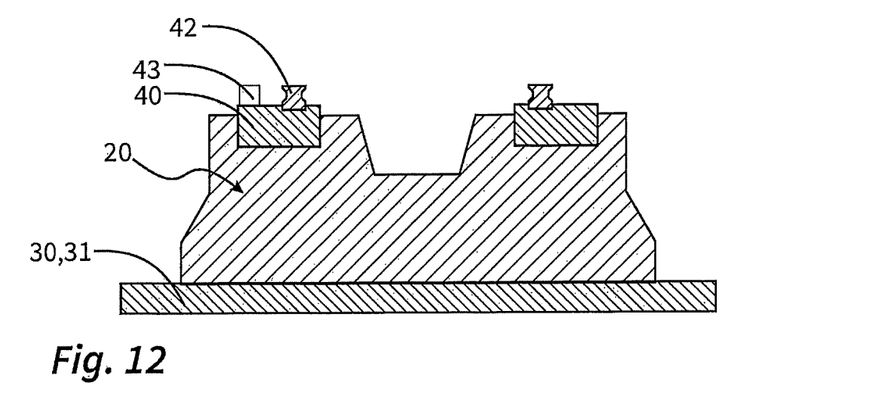
Figures 13A, 13B:
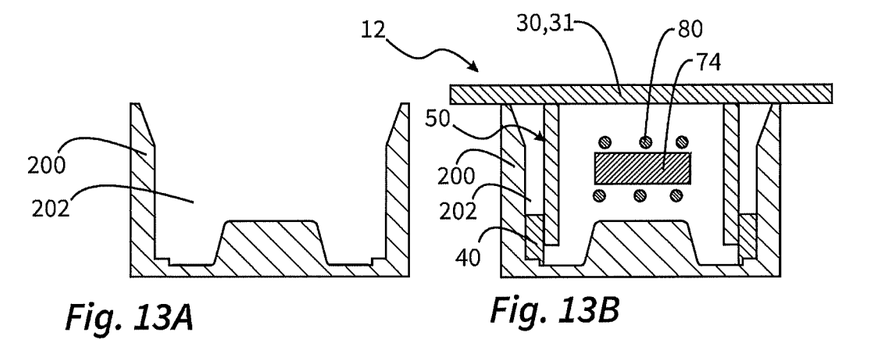
FIGS. 13A to 13D show a method for producing a support rail.
Figure 13C:
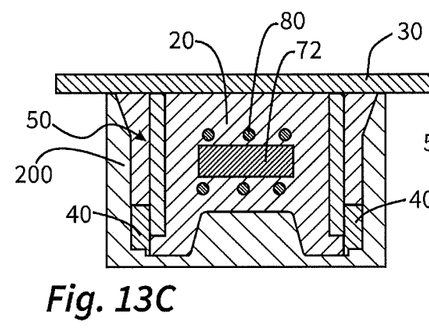
Figure 13D:
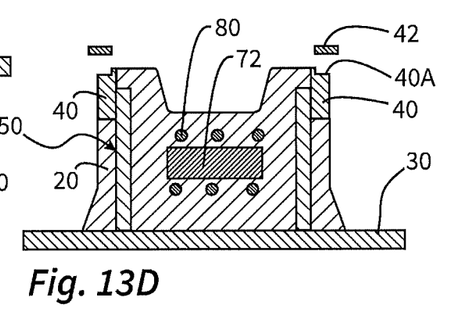

In the case of the embodiment according to FIG. 12, the arrangement of the guide rails 42 and of the connection flanges 40 belonging thereto is of a somewhat different kind to that in the preceding examples since the connection flanges are provided directly on the upward-facing side of the support structure 20.

The preferred manner of production of a support rail 10 according to the invention is shown in FIGS. 13A to 13D. Starting from formwork 200 produced from wood or metal and defining an upwardly open receiving space 202, a metal structure 12 is first of all inserted, comprising the connection flange 30 on the bottom side, the upper connection flanges 40 and the inner frame 50. As can be seen from FIG. 12B, this metal structure 12 is inserted into the formwork 200 in an upside down position relative to the subsequent alignment during use. In addition, further elements, such as polystyrene blocks 74, reinforcements 80 or the hollow profiles 72 (not shown), can be placed in the formwork 200 in this phase. As can be seen from FIG. 12C, the concrete is then poured into the formwork 200. It then predominantly surrounds the surfaces of the metal structure 12. It is only in the region of the lower connection flanges 30, which are at the top at this point in time, and of the upper connection flanges 40, which are at the bottom at this point in time, that the outer surfaces remain free of concrete. The inner frame 50, on the other hand, is surrounded by concrete, as are the reinforcement and the polystyrene blocks 74. After the concrete has hardened, the as yet unfinished support rail is removed from the formwork 200. Outer surfaces, in particular metal outer surfaces, of the metal structure 12 are then machined and, if appropriate, holes for mounting further attachments are formed in a machining centre. The grinding of the outer surfaces, e.g. of surface 40A, on which the guide rail 42 is mounted, also serves the purpose of enabling concrete residues to be removed therefrom during this process.

Machining only after the process of casting the concrete is very advantageous in respect of precision of production. Inaccurate positioning of the metal structure 12 within the formwork 200 or inaccurate assembly of the various elements of the metal structure 12 can usually be corrected in this phase after the casting of the support structure 20 by the machining which then follows.

The invention claimed is:

1. A motion system comprising:
   at least one support rail; and
   at least one robot platform on which a robot is arranged;
   the at least one support rail is an elongate component extending in a main direction of extent and comprises:
      at least one metal guide rail on an outer side of the at least one support rail and extending in the main direction of extent for guiding the at least one robot platform;
      at least one lower metal connection flange in a downward-facing subsection of the at least one support rail for fastening the at least one support rail on an underlying surface;
      at least one upper metal connection flange in an upward-facing subsection of the at least one support rail and on the outer side of the at least one support rail for the at least one metal guide rail; and
      a support structure made of concrete;
      wherein the at least one lower metal connection flange is mounted on an outer side of the support structure, wherein the at least one upper metal connection flange or the at least one metal guide rail is mounted on the outer side of the support structure;
      wherein at least one of the following is secured on the support structure by ties engaging positively in the support structure:
         (i) the at least one upper metal connection flange,
         (ii) the at least one lower metal connection flange, or
         (iii) the at least one metal guide rail.

2. The motion system according to claim 1, wherein:
   a cross-section of the at least one support rail perpendicular to the main direction of extent includes at least two of the ties.

3. The motion system according to claim 1, wherein:
   the at least one upper metal connection flange comprises a plurality of upper metal connection flanges; and
   a cross-section of the at least one support rail perpendicular to the main direction of extent includes at least two of the ties for the upper metal connection flanges.

4. The motion system according to claim 1, wherein:
   the ties extend into the support structure at different angles from the at least one upper metal connection flange.

5. The motion system according to claim 1, wherein:
   the ties each have a T-shaped cross-section.

6. A robot system comprising:
   a motion system having a support rail and a robot platform mounting a robot, wherein the robot platform is configured to be moved in a main direction of extent of the support rail;
   the robot being mounted on the robot platform;
   the support rail is an elongate component extending in the main direction of extent and comprises:
      at least one metal guide rail on an outer side of the support rail and extending in the main direction of extent for guiding the robot platform;
      at least one lower metal connection flange in a downward-facing subsection of the support rail for fastening the support rail on an underlying surface;
      at least one upper metal connection flange in an upward-facing subsection of the support rail and on the outer side of the support rail for the at least one metal guide rail; and
      a support structure made of concrete;
      wherein the at least one lower metal connection flange is mounted on an outer side of the support structure, wherein the at least one upper metal connection flange or the at least one metal guide rail is mounted on the outer side of the support structure;
      wherein at least one of the following is secured on the support structure by ties engaging positively in the support structure:
         (i) the at least one upper metal connection flange,
         (ii) the at least one lower metal connection flange, or
         (ii) the at least one metal guide rail.

7. The robot system according to claim 6, wherein:
   at least one of the following rests directly against the support structure:
      (i) the at least one upper metal connection flange,
      (ii) the at least one lower metal connection flange, or
      (iii) the at least one metal guide rail,
   because the concrete is poured thereon or is partially encased thereby.

8. The robot system according to claim 6, wherein:
   the at least one lower metal connection flange is formed by at least one baseplate having holes for mounting on the underlying surface.

9. The robot system according to claim 6, wherein:
   the at least one upper metal connection flange comprises at least two upper metal connection flanges, the at least one metal guide rail comprises at least two metal guide rails, each of the at least two upper metal connection flanges being provided for mounting one of the at least two metal guide rails, and each of the at least two upper metal connection flanges having at least one of the ties connected thereto.

10. The robot system according to claim 6, wherein:
the at least one upper metal connection flange comprises at least two upper metal connection flanges provided directly on outer sides of the support structure, each of the at least two upper metal connection flanges having the ties connected thereto, and the robot system further including a trough extending in the main direction of extent for accommodating a cable harness of the robot platform, the trough being provided in the support structure between the at least two upper metal connection flanges.

11. The robot system according to claim 6, further including:
a further metal connection flange for coupling a further support rail and/or for mounting an end stop for the robot platform, the further metal connection flange being provided on at least one end of the support rail.

12. The robot system according to claim 6, further including:
at least one end stop for the robot platform on at least one end of the support rail, directly on the outer side of the support structure.

13. The robot system according to claim 6, wherein:
the at least one lower metal connection flange comprises a plurality of lower metal connection flanges provided on an underside of the support rail.

14. The robot system according to claim 6, wherein:
the at least one lower metal connection flange is designed with a flat abutment surface or a supporting surface for extended-area abutment on the underlying surface thereof.

15. The robot system according to claim 6, wherein:
the at least one upper metal connection flange or the at least one lower metal connection flange is provided with a fastening hole or a fastening aperture for receiving a fastening screw.

16. The robot system according to claim 6, wherein:
the ties are formed at least partially by extruded profiles extending in the main direction of extent, and at least one of the following:
(i) the ties are located at intervals in the main direction of extent;
(ii) ventilation holes are provided in the extruded profiles; or
(iii) the ties are located at intervals in the main direction of extent and ventilation holes are provided in the extruded profiles.

17. The robot system according to claim 6, wherein:
the support structure is produced from cement concrete or from polymer concrete.

18. The robot system according to claim 6, wherein:
the support structure has at least one through channel as a transportation aid, wherein a hollow profile made of plastic and/or metal is provided to form the at least one through channel.

19. The robot system according to claim 6, wherein:
at least one free region is provided or at least one block of plastic is inserted into the concrete of the support structure to reduce the mass thereof.

20. The robot system according to claim 6, wherein:
a surface of the support structure is ground at least in one section thereof.

21. The robot system according to claim 6, wherein:
a surface of the support structure is provided at least in one section thereof with a coating.

22. The robot system according to claim 6, wherein:
a surface of the support rail has a length of at least 3 m in the main direction of extent.

23. The robot system according to claim 6, wherein:
a cross-section of the support rail perpendicular to the main direction of extent includes at least two of the ties.

24. The robot system according to claim 6, wherein:
the at least one upper metal connection flange comprises a plurality of upper metal connection flanges; and
a cross-section of the support rail perpendicular to the main direction of extent includes at least two of the ties for the upper metal connection flanges.

25. The robot system according to claim 6, wherein:
the ties extend into the support structure at different angles from the at least one upper metal connection flange.

26. The robot system according to claim 6, wherein:
the ties each have a T-shaped cross-section.

\* \* \* \* \*